United States Patent
Lee et al.

(10) Patent No.: US 7,027,506 B2
(45) Date of Patent: Apr. 11, 2006

(54) OBJECT-BASED BIT RATE CONTROL METHOD AND SYSTEM THEREOF

(75) Inventors: Jin Soo Lee, Seoul (KR); Jae Shin Yu, Seoul (KR); Ki Su Park, Seoul (KR)

(73) Assignee: LG Electronics Inc., Seoul (KR)

( * ) Notice: Subject to any disclaimer, the term of this patent is extended or adjusted under 35 U.S.C. 154(b) by 339 days.

(21) Appl. No.: 10/259,726

(22) Filed: Sep. 30, 2002

(65) Prior Publication Data

US 2003/0095599 A1 May 22, 2003

(30) Foreign Application Priority Data

Nov. 17, 2001 (KR) ................................. 2001-71653

(51) Int. Cl.
*H04N 7/12* (2006.01)
(52) U.S. Cl. ............ 375/240.03; 375/240; 375/240.01; 375/240.02; 375/240.12
(58) Field of Classification Search ........... 375/240.03, 375/240, 240.01, 240.12, 240.16, 240.24, 375/240.02; 382/242, 251
See application file for complete search history.

(56) References Cited

U.S. PATENT DOCUMENTS

| 5,635,986 | A | * | 6/1997 | Kim | ...................... 375/240.16 |
| 5,881,175 | A | * | 3/1999 | Kim | .......................... 382/242 |
| 6,208,693 | B1 | * | 3/2001 | Chen et al. | ............ 375/240.24 |
| 6,539,124 | B1 | * | 3/2003 | Sethuraman et al. | ........ 382/251 |

FOREIGN PATENT DOCUMENTS

| KR | 23278 A | 4/2000 |
| WO | WO 00/46999 | * 8/2000 |

* cited by examiner

*Primary Examiner*—Allen Wong
(74) *Attorney, Agent, or Firm*—Fleshner & Kim, LLP

(57) ABSTRACT

An object-based bit rate control method and a system therefore provides a user with satisfactory quality of image by using significance of the object. The object is separated from the image, and significance is imposed on each object. A quantization parameter is differently varied according to the significance of the object. Especially, a variable width of the quantization parameter is controlled in a boundary region of the object and the other regions.

18 Claims, 4 Drawing Sheets

OBJECT-BASED BIT RATE CONTROL METHOD AND SYSTEM THEREOF

BACKGROUND OF THE INVENTION

1. Field of the Invention

The present invention relates to an image transmission system, and more particularly to a method for varying a quantization parameter (QP) according to significance of an object by using an object-based bit rate control system.

2. Background of the Related Art

In general, when a transmission bandwidth is restricted or varied in an image transmission system, a bit rate is controlled according to conditions of a given channel to efficiently transmit an image data including plenty of information through the channel. Exemplary bit rate control methods include a forward control method for allocating a bit rate in consideration of characteristics of an input image, and a backward control method for determining a parameter of an encoder in consideration of characteristics of a back terminal of a source encoder (namely, output terminal) such as condition information of a buffer (for example, bit rate).

An image encoder for low-speed transmission media such as image communication or videophone communication must show superior performance in compression efficiency and low complexity. Therefore, most of the image encoders for low-speed transmission media employ the backward control method for controlling the bit rate by regulating the quantization parameter (QP) considering conditions of the buffer.

FIG. 1 is a schematic structure view illustrating a conventional bit rate control system. The system includes a characteristic analyzer 101 for analyzing characteristics of an input image, a quantizer 102 for encoding the image, an output buffer 103 for outputting the encoded image as bit rows, a target bit allocator 104 for allocating a target bit on the basis of condition information of the characteristic analyzer 101 and the output buffer 103, and a bit rate regulator 105 for regulating a bit rate according to the allocated target bit.

The characteristic analyzer 101 analyzes the characteristics of the image data and provides the result to the target bit allocator 104, and the target bit allocator 104 allocates the target bit according to the characteristic result of the image data and the condition information of the output buffer 103. The bit rate regulator 105 regulates the bit rate by using the QP of the quantizer 102 according to the target bit allocated by the target bit allocator 104, and the quantizer 102 quantizes the image data according to the regulated bit rate and stores the encoded data in the output buffer 103. The output buffer 103 adjusts the bit rows to be outputted at a predetermined speed and performs functions for preventing overflow or deficiency of a buffer, which may generate during bit row reconstitution.

Here, the bit rate regulator 105 uses the QP as an encoding parameter for regulating the bit rate. For example, when the QP has a high value, the bit rate is lowered but the quality of image is reduced. In the case that the QP has a low value, the bit rate is increased but the quality of image is improved. That is, the quality of image and the bit rate are contrary to each other. Accordingly, when a bandwidth of the network is reduced to lower the bit rate, the quality of image is reduced.

However, the conventional bit rate control method usually suggests one arithmetic model (for example, linear model, non-linear model, Laplician mode, exponential mode, Gaussian mode, etc.) for the whole images, and allocates the bit according to the model. It is thus impossible to decide an optimal QP for the characteristics or significant region (for example, face, eyes, nose or mouth of a person) of the input image. That is, even if the region is significant, when the bit rate is lowered due to poor network environment, the quality of image is reduced. In addition, even if the region is not significant, it can have higher image quality than the significant region due to variations of the network environment.

The correlation between the bit rate and the image quality must be considered in the image communication or videophone communication. That is, the user is more sensitive to reduction of image quality of the significant or interest region than the insignificant or non-interest region. The image quality of the significant or interest region is a more important factor by which the user judges the quality of image than the image quality of the full screen.

The conventional bit rate control method uniformly encodes the full screen according to the QP, and thus provides the user with poor quality of image in the significant region which the user is sensitive to.

Moreover, the conventional bit rate control method regulates the QP according to overflow or deficiency of the output buffer, and thus fails to provide the user with the high quality of image due to big differences and reduction of the quality of image according to conditions of the network

SUMMARY OF THE INVENTION

A purpose of the invention is to solve at least the above problems and/or disadvantages and to provide at least the advantages described hereinafter.

Accordingly, one purpose of the present invention is to provide an object-based bit rate control method and a system therefor which can differently control the bit rate according to significance.

Another purpose of the present invention is to provide a method for varying a QP which can vary the QP by using different modes according to a region property of the object in controlling a bit rate.

These and other purposes and advantages are achieved by providing an object-based bit rate control method which includes: segmenting a region of interest from the image; and differently varying a quantization parameter according to the significance of at least one macro block.

Here, a low QP is set up in the macro blocks of the region of interest, and a high QP is set up in the macro blocks of the background region.

The macro block included in a user region has higher significance than the macro block included in a background region.

Different QP modes are used according to whether the significance-imposed macro block is a boundary macro block Here, exemplary QP modes include an 'arbitrary QUANT selection mode' and a 'small-step QUANT alteration mode'.

According to another aspect of the invention, a method for varying a quantization parameter in performing an object-based bit rate control includes steps of: confirming whether a significance-imposed macro block is a boundary macro block existing between a user region and a background region; varying the quantization parameter in a large width when the macro block is the boundary macro block; and varying the quantization parameter in a small width when the macro block is not the boundary macro block.

According to further another aspect of the invention, an object-based bit rate control system includes: means for segmenting a region of interest from an image; means for differently varying a quantization parameter depending upon whether the macro block is in the region of interest or not; and means for encoding the macro blocks according to the varied quantization parameter.

The object can be separated by using a face region-extracting algorithim, which has been actively investigated.

Additional advantages, purposes, and features of the invention will be set forth in part in the description which follows and in part will become apparent to those having ordinary skill in the art upon examination of the following or may be learned from practice of the invention. The purposes and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

The following detailed description will present preferred embodiments of the invention in reference to the accompanying drawings.

Figure 1:
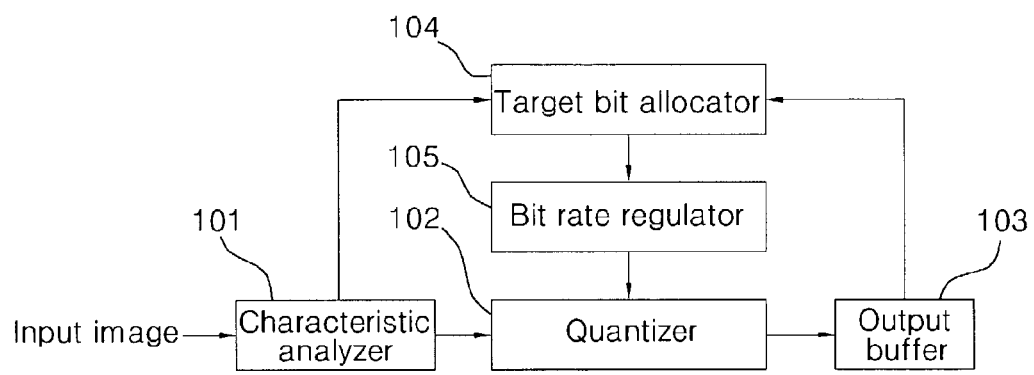
FIG. 1 is a schematic structure view illustrating a conventional bit rate control system.
Figure 2:
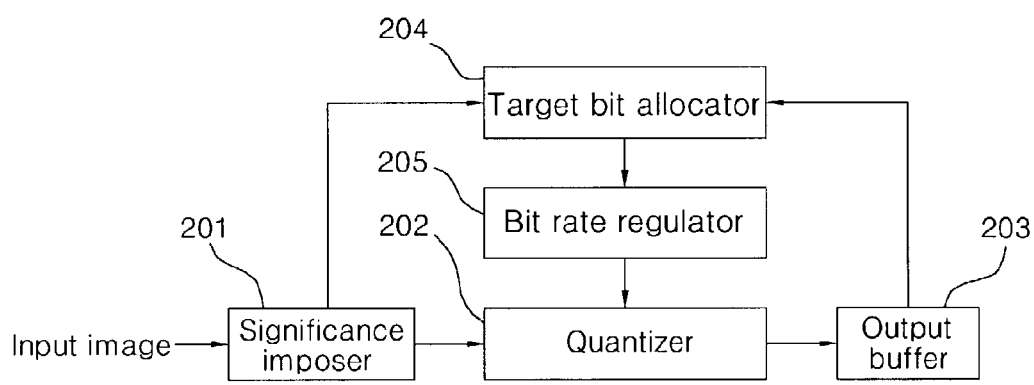
FIG. 2 is a schematic structure view illustrating a bit rate control system in accordance with the present invention.

FIG. 2 is a schematic structure view illustrating a bit rate control system in accordance with the present invention. As illustrated in FIG. 2, the bit rate control system includes a significance imposer 201, a quantizer 202, an output buffer 203, a target bit allocator 204 and a bit rate regulator 205.

The significance imposer 201 separates an object from an input image. Here, the object can be separated according to a face-region extracting algorithm, which has been actively investigated. The separated object generally includes at least one 16*16 macro block. The object is divided into a user region, a background region and a boundary region. The boundary region indicates a region existing between the user region and the background region. The user region may include a person, face, eyes, nose, mouth or combinations thereof.

The significance imposer 201 imposes significance on the macro blocks included in the separated object region. Here, the separated object region is the user region and it is the region of interest in the video communication. Preferably, the macro block of the user region has higher significance than that of the background region. That is, it implies that the macro block of the user region is more important than that of the background region. As described above, significance is differently imposed and the QP is varied according to different significance, thereby improving quality of image in the user region. In the meantime, a process of imposing significance can be excluded because the region of interest usually has high significance. Instead, in this case, the QP is varied depending upon whether the macro block is in the region of interest or not.

On the other hand, the condition information of a network confirmed in the output buffer 203 is provided to the target bit allocator 204 to allocate a target bit. That is, the target bit allocator 204 senses the current condition of the network on the basis of the condition information from the output buffer 203, and allocates the target bit.

The bit rate regulator 205 differently varies the QP according to significance of the macro block imposed by the significance imposer 201.

The quantizer 202 quantizes the macro blocks according to the varied QP. Here, the quantizer 202 quantizes all the significance-imposed macro blocks.

The output buffer 203 receives the encoded macro blocks and outputs bit rows. Such bit rows are transmitted through a channel having a restricted bandwidth.

When a multimedia image is transmitted through the network, the object-based bit rate control method separates the object having macro block units from the input image, imposes significance on each macro block varies the QP according to the significance-imposed macro blocks, and quantizes the respective macro blocks by using the varied QP.

When it is explained by using motion picture standards such as H.263 or MPEG1/2, the respective frames of the given image are encoded in macro block units of 16*16. Luminance elements and chrominance elements of the macro blocks quantize coefficient values generated according to the discrete cosine transform (DCT) and represent them as N bits. The quantized bits are encoded according to a variable length coding (VLC). Here, the QP determines a quantization method. A bit number smaller than the setup QP is transformed into '0'. Accordingly, when the QP is high, the bits transformed into '0' are increased. In the case that the bits are encoded according to the VLC, a number of the bits is decreased, but loss of the information due to the quantization is increased, which deteriorates the quality of image. Conversely, when the QP is low, loss of the information due to the quantization is decreased and the quality of image is improved, but load of data transmitted through a network having a restricted bandwidth is increased.

In accordance with the present invention, the interest region or significant region is separated from the transmitted image, the relatively low QP is set up in the interest region or significant region to improve the quality of image, and the relatively high QP is set up in the non-interest region or insignificant region to reduce load of data transmission.

The object-based bit rate control method according to the present invention will now be explained in detail with reference to FIG. 3.

Figure 3:
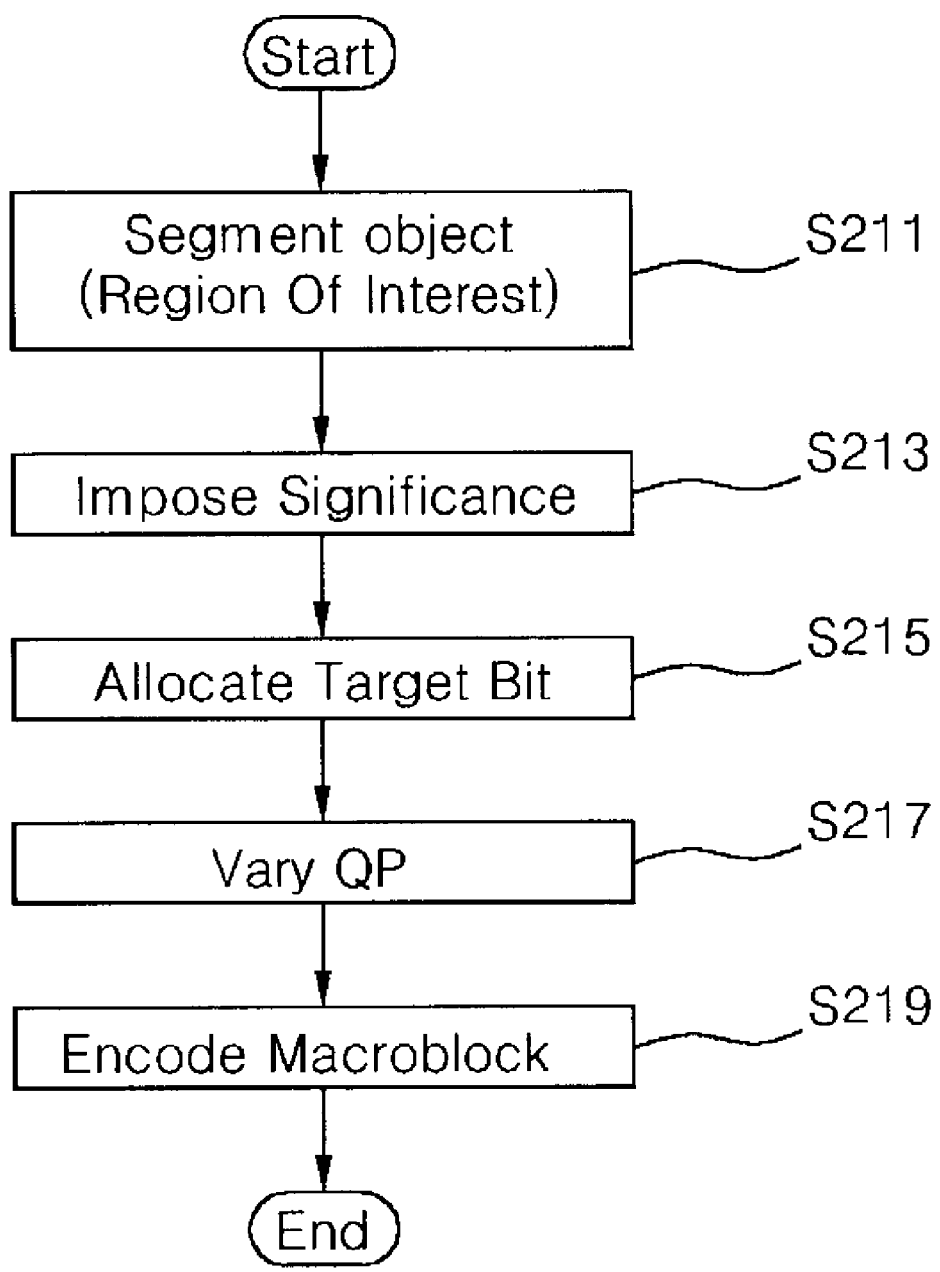
FIG. 3 is a flowchart showing an object-based bit rate control method in accordance with the present invention.

Referring to FIG. 3, the region of interest is segmented from the input image (step 211). As set forth above, the region of interest may be the user region, background region or boundary region. The region of interest includes at least one macro block according to a size of the region.

In accordance with the present invention, significance is imposed on the macro blocks included in the separated object (step 213). Here, the macro block of the user region has higher significance than the macro block of the background region.

As described above, the high significance is imposed on the user region because the user region is more sensitive in quality of image than the background region. When the bit rate of the network is lowered, the image quality of the user region having relatively high significance is maitained high, but the image quality of the background region having relatively low significance is decreased in order to satisfy the user and reflect the condition of the network.

Still referring to FIG. 3, the target bit allocator allocates the target bit on the basis of the condition information of the network from the output buffer (step 215).

When the target bit is allocated, the bit rate regulator varies the QP according to significance imposed in macro block units by the significance imposer (step 217).

The respective macro blocks are encoded according to the varied QP (step 219).

In accordance with the present invention, the Annex T (modified QP) provided by H.263+ is employed to vary the QP. In the existing H.263, the QP can be varied from +2 to −2 of the QP of the previous macro block in macro block units. That is, the variable range of the QP for varying the bit rate is ±2 of the QP of the previous macro block. Since the variable range of the QP is narrow in H.263, it is difficult to adapt to variations of the network environment and to distinguish the significant region from the insignificant region.

However, Annex T provided by H.263+ uses 2 bits of a small-step QUANT alternation mode and controls the QP by using difference of designated QUANTs as shown in following Table 1, or uses 6 bits of an arbitrary QUANT selection mode and expands the variable range of the QP from 1 to 31 regardless of the previous QP.

TABLE 1

| Prior QUANT | Change QUANT | |
|---|---|---|
| | DQUANT = 10 | DQUANT = 11 |
| 1 | +2 | +1 |
| 2–10 | −1 | +1 |
| 11–20 | −2 | +2 |
| 21–28 | −3 | +3 |
| 29 | −3 | +2 |
| 30 | −3 | +1 |
| 31 | −3 | −5 |

That is, the QP can be varied using 'small-step QUANT alternation mode' or 'arbitrary QUANT selection mode' defined in Annex T of H.263+. The small-step QUANT alternation mode is used to decrease a variable width of the QP, and the arbitrary QUANT selection mode is used to increase the variable width of the QP.

Figure 5:
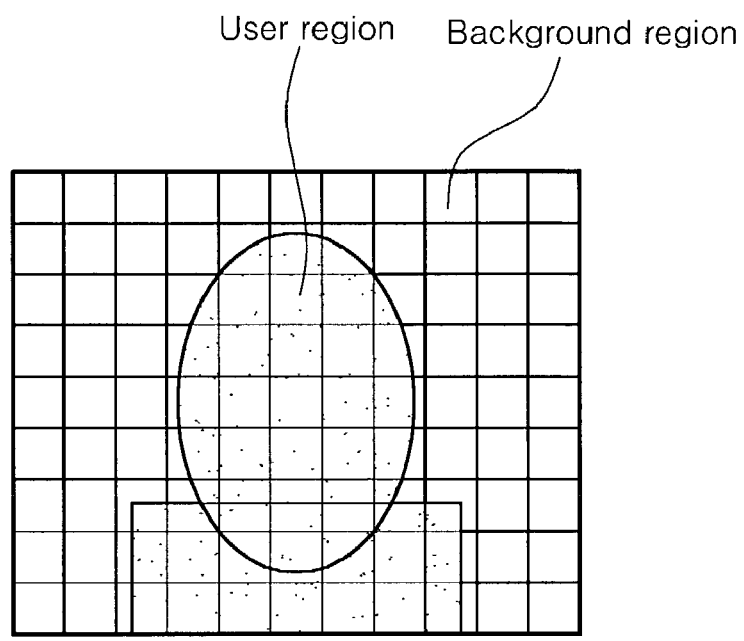
FIG. 5 is an exemplary view showing one example of object segmentation in accordance with the present invention.

On the other hand, the arbitrary QUANT selection mode is preferably used to rapidly easily control the bit rate. FIG. 5 shows an example of object segmentation of a user region and a background region. As shown in FIG. 5, when the background region and the user region are separated by the object segmentation in the image communication, the two regions are encoded by using different QPs. Since the QP is selected from 1 to 31 for each macro block regardless of the QP of the previous macro block in the arbitrary QUANT selection mode, the user separates the image based on object, decides significance, and differently quantizes the respective macro blocks, thereby controlling the bit rate. In case the image is divided into the user region and the background region as shown in FIG. 3, the user region is quantized by using a relatively low QP to maintain plenty of DCT coefficient information, and the background region is quantized by using a relatively high QP to remove the DCT coefficient information, thereby controlling the bit rate.

Accordingly, the interest or significant region is displayed with high quality of image, and the non-interest or insignificant region lowers a number of bits.

However, when the two regions, namely the user region and the background region use the arbitrary QUANT selection mode of Annex T, a number of additional header bits is increased to cause load to bit rate control. That is, when 2-bit header is necessary for each macro block in the small-step QUANT alternation mode, 6-bit header is required for the arbitrary QUANT selection mode. The additional bits are added to each macro block, which may increase overhead.

Figure 4:
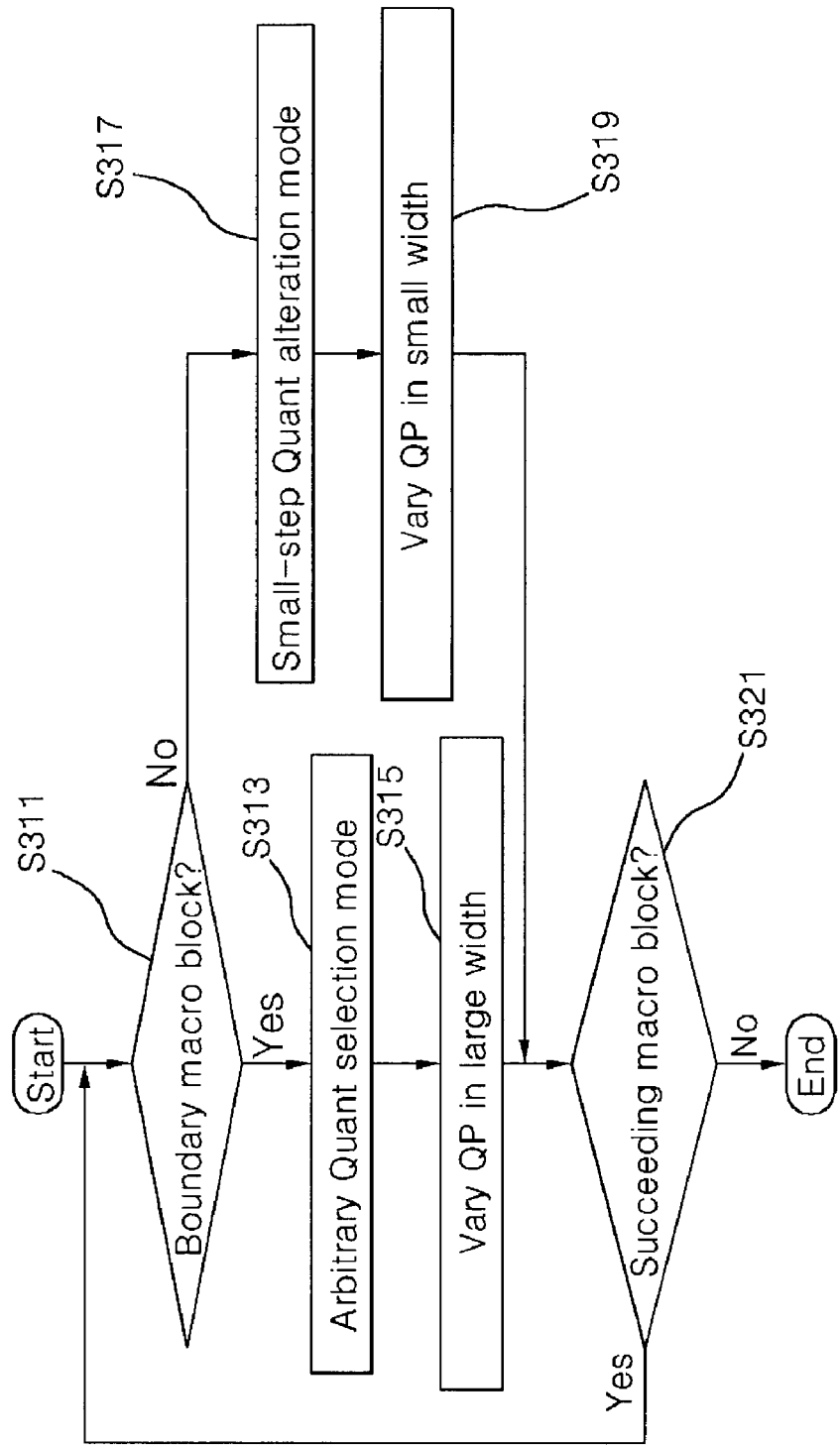
FIG. 4 is a flowchart showing a method for differently varying a QP in the object-based bit rate control method in accordance with the present invention.

In order to solve the foregoing problem, a method is suggested in FIG. 4.

Figure 6:
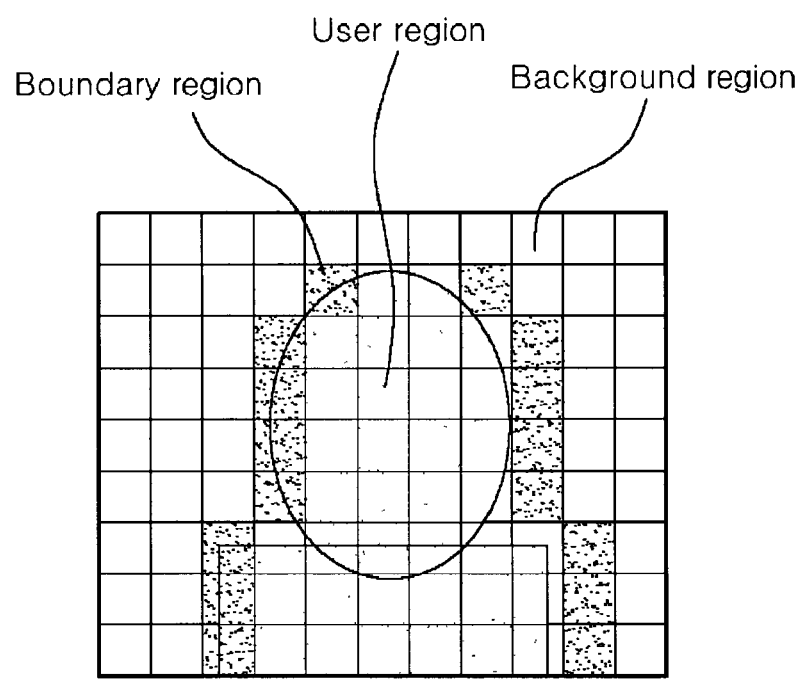
FIG. 6 is an exemplary view showing another example of the object segmentation in accordance with the present invention.

FIG. 4 is a flowchart showing a method for differently varying the QP by using a boundary macro block in the object-based bit rate control method in accordance with the present invention. The boundary macro block will now be explained with reference to FIG. 6 before explaining FIG. 4. As illustrated in FIG. 6, the object is divided into a user region, a background region and a boundary region. Hereinafter, a macro block of the user region is referred to as a user macro block, a macro block of the background region is referred to as a background macro block, and a macro block of the boundary region is referred to as a boundary macro block. Here, the boundary macro block implies a macro block, which exists between the user region and the background region in the order of macro blocks coded.

When an encoder encodes macro blocks in a frame, the order of blocks to be encoded is from top line to bottom line, and from left block to right block in a line. In the order, the macro blocks where the change is occurred from background block to region of interest block or from region of interest block to background block are boundary macro blocks. So, In the case of the change from background to region of interest, the boundary macro block is in the region of interest, but the change from region of interest to background, the boundary macro block is in the background. This is shown in FIG. 6. In the figure, the gray macro blocks are boundary blocks where the change is occurred.

In general, the QPs have a big difference in the boundary macro block and a small difference in the user macro block and the background macro block. As depicted in FIG. 4, the QP is varied using the arbitrary QUANT selection mode or small-step QUANT alternation mode according to the difference of the QPs.

Still referring to FIG. 4, the bit rate regulator conforms whether the significance-imposed macro blocks by the significance imposer are the boundary macro block existing between the user region and the background region (step 311).

Here, whether the macro blocks are the boundary macro block is confirmed by using luminance and chrominance elements of each macro block. That is, there is a difference in the luminance and chrominance elements among the user macro block the background macro block and the boundary macro block divided in FIG. 6. The boundary macro block can be easily confirmed by using the difference.

As the confirmation result, when the macro block is the boundary macro block, the QP mode is converted into the arbitrary QUANT selection mode (step 313). When the QP mode is converted into the arbitrary QUANT selection mode, the QP is varied in a large width (step 315).

When the macro block is not the boundary macro block, the QP mode is converted into the small-step QUANT alternation mode (step 317). The QP is varied in a small width by the small-step QUANT alternation mode (step 319).

Therefore, the QP is varied in a large width only for the boundary macro block by using the arbitrary QUANT selection mode, and varied in a small width for the user macro block or background macro block by using the small-step QUANT alternation mode. Accordingly, 6-bit header is used only for the boundary macro block, and 2-bit header is used for the user macro block or background macro block. As compared with that 6-bit header is used for the whole frames, a number of the header bits is remarkably reduced to vary the bit rate in macro block units.

On the other hand, when a succeeding macro block exists, the routine goes to step 311, and if not, the routine is ended (step 321).

As described above, the QP is varied in a large width only for the boundary macro block by using the arbitrary QUANT selection mode, and varied in a small width for the user macro block or background macro block by using the small-step QUANT alternation mode, thereby reducing the number of the header bits to prevent overhead.

In this embodiment, the method for efficiently controlling the bit rate in the network environment such as the image communication or videophone communication was described. However, the technology of the invention can be used as the method for controlling the bit rate for motion pictures such as video mail. That is, when an image obtained by a mobile terminal is encoded according to the method of the invention, the whole-encoded image has a small size and high quality.

In the object-based bit rate control method and the system therefor in accordance with the present invention, when a video is divided based on object in the image communication or video-phone transmission, a specific object can be set up to have high significance. It is thus possible to handle the low bit rate of the network environment by improving the quality of image in the significant region and reducing the quality of image in the insignificant region.

In the method for varying the QP in controlling the bit rate in accordance with the present invention, the variable width of the QP is adjusted in the boundary region and the other regions, thereby preventing overhead due to excessive headers.

In the object-based bit rate control method and the system therefor in accordance with the present invention, the user can be provided with satisfactory quality of image by transmitting plenty of information on the significant region and less information on the insignificant region.

Especially, the method and system of the present invention is suitable for the radio mobile communication such as the IMT2000. Since the radio mobile communication has a lower network environment than the cable mobile communication, it is very important to obtain high quality of image in a low bit rate.

While the invention has been shown and described with reference to certain preferred embodiments thereof, it will be understood by those skilled in the art that various changes in form and details may be made therein without departing from the spirit and scope of the invention as defined by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An object-based bit rate control method in a system for transmitting images by macro block units, comprising:
    segmenting a region of interest from the image; and
    differently varying a quantization parameter depending on whether the macro block is in the region of interest or not, wherein different quantization parameter modes are used depending upon whether the macro block is a boundary macro block between the region of interest and background region, wherein an arbitrary QUANT selection mode is used as a quantization parameter mode, when the macro block is the boundary macro block, and wherein a small-step QUANT alteration mode is used as a quantization parameter mode when the macro block is not the boundary macro block, wherein the arbitrary QUANT selection mode uses additional bits and expands the variable range of the quantization parameter relative to the variable range of the quantization parameter set by the small-step QUANT alteration mode.

2. The method according to claim 1, wherein a low quantization parameter is set up in the macro blocks of the region of interest and a high quantization parameter is set up in the macro blocks of the background region.

3. The method according to claim 1, wherein the region of interest means a user region.

4. The method according to claim 1, wherein the user region includes a person, face, eyes, nose, mouth or selective combinations thereof.

5. The method according to claim 1, wherein the boundary macro block is a single macro block that exists between the user region and the background region in the order of coded macro blocks.

6. The method according to claim 1, wherein the small-step QUANT alteration mode is used to decrease a variable width of the QP, and wherein the arbitrary QUANT selection mode is used to increase the variable width of the QP.

7. The method according to claim 1, wherein the arbitrary QUANT selection mode uses 6 bits and expands the variable range of the quantization parameter from 1–31, and wherein the small-step QUANT alteration mode uses 2 bits and sets the variable range of the quantization parameter to ±2.

8. A method for varying a quantization parameter in performing an object-based bit rate control, comprising the steps of:
    confirming whether a macro block is a boundary macro block existing between a user region and a background region;
    varying the quantization parameter in a large width when the macro block is the boundary macro block by using an arbitrary QUANT selection mode that uses at least 3 bits and expands the variable range of the guantization parameter from a small-step QUANT alteration mode, and
    varying the quantization parameter in a small width when the macro block is not the boundary macro block by using the small-step QUANT alteration mode that uses 2 bits and sets the variable range of the quantization parameter to ±2.

9. The method of claim 8, wherein the boundary macro block is a single macro block that exists between the user region and the background region in the order of coded macro blocks.

10. An object-based bit rate control method in a system for transmitting an image in macro block units, the method comprising the steps of:
   segmenting a region of interest from the image;
   varying a quantization parameter depending on whether the macro block is in the region of interest or not; and
   encoding the macro blocks according to the varied quantization parameter, wherein an arbitrary QUANT selection mode that uses 6 bits and expands the variable range of the quantization parameter from 1–31 is used as the quantization parameter mode when the macro block is the boundary macro block, while a small-step QUANT alteration mode that uses 2 bits and sets the variable range of the quantization parameter to ±2 is used as the quantization parameter mode when the macro block is not the boundary macro block.

11. The method according to claim 10, further comprising allocating a target bit according to condition information of a network inputted from an output terminal, prior to the step for varying the quantization parameter.

12. The method according to claim 10, wherein the region of interest is a user region.

13. The method according to claim 10, wherein the step of varying the quantization parameter comprises the steps of:
   confirming whether the macro block is the boundary macro block existing between the region of interest and a background region;
   varying the quantization parameter in a large width when the macro block is the boundary macro block, and
   varying the quantization parameter in a small width when the macro block is not the boundary macro block.

14. The method according to claim 10, wherein a low quantization parameter is set up in the macro blocks of the region of interest, and a high quantization parameter is set up in the macro blocks of the background region.

15. The method according to claim 10, wherein the region of interest is segmented from the image by using a face-region extracting algorithm.

16. An object-based bit rate control system, comprising:
   means for segmenting region of interest from an image;
   means for differently varying a quantization parameter depending on whether the macro block is in the region of interest or not; and
   means for encoding the macro blocks according to the varied quantization parameter, wherein different quantization parameter modes are used depending upon whether the macro block is a boundary macro block between the region of interest and background region, wherein an arbitrary QUANT selection mode is used as a quantization parameter mode when the macro block is the boundary macro block, and wherein a small-step QUANT alteration mode is used as a quantization parameter mode when the macro block is not the boundary macro block, wherein the arbitrary QUANT selection mode uses 6 bits and expands the variable range of the guantization parameter from 1–31, and wherein the small-step QUANT alteration mode uses 2 bits and sets the variable range of the quantization parameter to ±2.

17. The system according to claim 16, further comprising means for allocating a target bit according to condition information of a network inputted from an output terminal.

18. The system according to claim 16, wherein a low quantization parameter is set up in the macro blocks of the region of interest, and a high quantization parameter is set up in the macro blocks of the background region, wherein the small-step QUANT alteration mode is used to decrease a variable width of the QP, and wherein the arbitrary QUANT selection mode is used to increase the variable width of the QP.

* * * * *